(12) United States Patent
Moussa

(10) Patent No.: US 10,334,254 B2
(45) Date of Patent: Jun. 25, 2019

(54) FEED-FORWARD AND FEED-BACK METADATA EXCHANGE IN IMAGE PROCESSING PIPELINES TO IMPROVE IMAGE QUALITY

(71) Applicant: Apple Inc., Cupertino, CA (US)

(72) Inventor: Nader Moussa, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/275,026

(22) Filed: Sep. 23, 2016

(65) Prior Publication Data

US 2018/0091773 A1  Mar. 29, 2018

(51) Int. Cl.
| | |
|---|---|
| G06T 1/20 | (2006.01) |
| H04N 7/14 | (2006.01) |
| H04N 19/11 | (2014.01) |
| H04N 19/17 | (2014.01) |
| H04N 19/46 | (2014.01) |
| H04N 5/232 | (2006.01) |
| H04N 5/235 | (2006.01) |

(Continued)

(52) U.S. Cl.
CPC ............ *H04N 19/176* (2014.11); *G06T 1/20* (2013.01); *H04N 5/2353* (2013.01); *H04N 5/2355* (2013.01); *H04N 5/23206* (2013.01); *H04N 5/23232* (2013.01); *H04N 5/23296* (2013.01); *H04N 5/243* (2013.01); *H04N 7/147* (2013.01); *H04N 19/11* (2014.11); *H04N 19/117* (2014.11); *H04N 19/132* (2014.11); *H04N 19/167* (2014.11); *H04N 19/17* (2014.11); *H04N 19/46* (2014.11)

(58) Field of Classification Search
CPC .................................................. G06T 2200/28
See application file for complete search history.

(56) References Cited

U.S. PATENT DOCUMENTS

| 6,088,392 A | 7/2000 | Rosenberg |
| 7,706,576 B1 | 4/2010 | Beck et al. |

(Continued)

*Primary Examiner* — Phung-Hoang J Nguyen
(74) *Attorney, Agent, or Firm* — Baker & Hostetler LLP

(57) ABSTRACT

Techniques are disclosed for improving operation of image processing systems. A first component generates metadata representing its operational parameters. The metadata is relayed to another component of the image processing pipeline and the other component alters an operational parameter of its operation based on the metadata. In one embodiment, the metadata may be relayed "upstream" within an image processing system, from a component that is a farther distance from a source of image data to a component that is nearer to the source of image data. In another embodiment, the metadata may be relayed "downstream" within an image processing system, from a component that is a closer distance from a source of image data to a component that is farther from the source of image data. In still other embodiments, bidirectional exchange of metadata may occur, where a single component receives metadata both from an upstream source and a downstream source. In a further embodiment, a processing system may duplicate a single stream of image data and process each stream separately. In such embodiments, metadata may be generated that is specific to one of the streams, in which case, the metadata may be used to alter an operational parameter of a process specific to its respective stream.

22 Claims, 4 Drawing Sheets

(51) Int. Cl.
*H04N 5/243* (2006.01)
*H04N 19/117* (2014.01)
*H04N 19/132* (2014.01)
*H04N 19/167* (2014.01)
*H04N 19/176* (2014.01)

(56) References Cited

U.S. PATENT DOCUMENTS

| | | | | |
|---|---|---|---|---|
| 8,922,633 B1* | 12/2014 | Pfeffer | ............... | H04N 7/183 348/65 |
| 9,264,372 B2 | 2/2016 | Stanwood et al. | | |
| 9,595,299 B2* | 3/2017 | Redmann | ............... | G03B 31/02 |
| 2004/0258308 A1* | 12/2004 | Sadovsky | ........... | H04N 1/32128 382/190 |
| 2008/0159136 A1* | 7/2008 | Mallesan | ........... | H04L 12/5695 370/230 |
| 2012/0120301 A1* | 5/2012 | Ferren | ............... | G02B 13/0065 348/340 |
| 2014/0098295 A1* | 4/2014 | Glen | ............... | H04N 21/84 348/575 |
| 2015/0035999 A1* | 2/2015 | Shehane | ............... | H04N 5/225 348/207.1 |
| 2015/0036052 A1* | 2/2015 | Glen | ............... | G09G 5/006 348/571 |
| 2015/0350598 A1* | 12/2015 | Yang | ............... | H04W 24/08 348/14.02 |
| 2016/0004921 A1* | 1/2016 | McCarthy | ............... | H04N 19/17 382/173 |
| 2016/0007047 A1* | 1/2016 | Hosseini | ............... | H04N 7/147 348/14.13 |
| 2016/0034459 A1* | 2/2016 | Larsen | ............... | G06F 17/30044 707/740 |
| 2016/0063002 A1* | 3/2016 | Eyal | ............... | G06F 17/30038 709/219 |
| 2016/0072999 A1* | 3/2016 | Miyasako | ............ | H04N 5/2329 348/208.6 |
| 2016/0092561 A1* | 3/2016 | Liu | ............... | G06F 17/30843 386/230 |
| 2016/0100147 A1* | 4/2016 | Kim | ............... | H04N 5/20 386/242 |
| 2016/0180496 A1* | 6/2016 | Kasai | ............... | G09G 5/001 345/545 |
| 2016/0203386 A1* | 7/2016 | Porecki | ............... | G06T 11/00 382/159 |
| 2016/0371341 A1* | 12/2016 | Shapira | ............ | G06F 17/30539 |
| 2017/0006336 A1* | 1/2017 | Lee | ............... | H04L 1/0045 |
| 2017/0062004 A1* | 3/2017 | Ravn | ............... | G11B 27/005 |

\* cited by examiner

200

400

600

FEED-FORWARD AND FEED-BACK METADATA EXCHANGE IN IMAGE PROCESSING PIPELINES TO IMPROVE IMAGE QUALITY

BACKGROUND

The present disclosure is directed to control techniques for image processing systems.

Many modern consumer electronics devices include image processing capability. Although implementations vary, such devices often possess a camera system to capture image data, a codec to code image data according to a compression protocol, and one or more applications that execute on a central processing unit to process the image data.

The functional units within such systems typically perform their respective operations independently of operations of other functional units. For example, a camera system may select parameters for image capture independently of the operation of a video coder. The camera system may select exposure levels and frame rates of captured data without regard for how a coder might process this data. Similarly, the coder and the application may process the image data without regard for how each other performs its respective roles.

The inventor has determined that the independent operation of image processing components can lead to inefficient operation within a device. For example, if an application consumes image data at a predetermined frame rate, a camera that generates image data in excess of the frame rate would create inefficiency within the device as a whole. Thus, the inventor has recognized a need in the art to improve operation of image processing systems to improve image quality and resource usage within such systems.

DETAILED DESCRIPTION

Embodiments of the present disclosure provide techniques for improving operation of image processing systems. A first component generates metadata representing its operational parameters. The metadata is relayed to another component of the image processing pipeline and the other component alters an operational parameter of its operation based on the metadata. In one embodiment, the metadata may be relayed "upstream" within an image processing system, from a component that is a farther distance from a source of image data to a component that is nearer to the source of image data. In another embodiment, the metadata may be relayed "downstream" within an image processing system, from a component that is a closer distance to a source of image data to a component that is farther from the source of image data. In still other embodiments, bidirectional exchange of metadata may occur, where a single component receives metadata both from an upstream component and a downstream component.

Embodiments of the present disclosure also may employ metadata in processing systems in which a single stream of image data is duplicated and processed by separate processing sequences. In such embodiments, metadata may be generated that is specific to one of the data streams, in which case, the metadata may be used to alter an operational parameter of a process specific to its respective stream.

Figure 1:
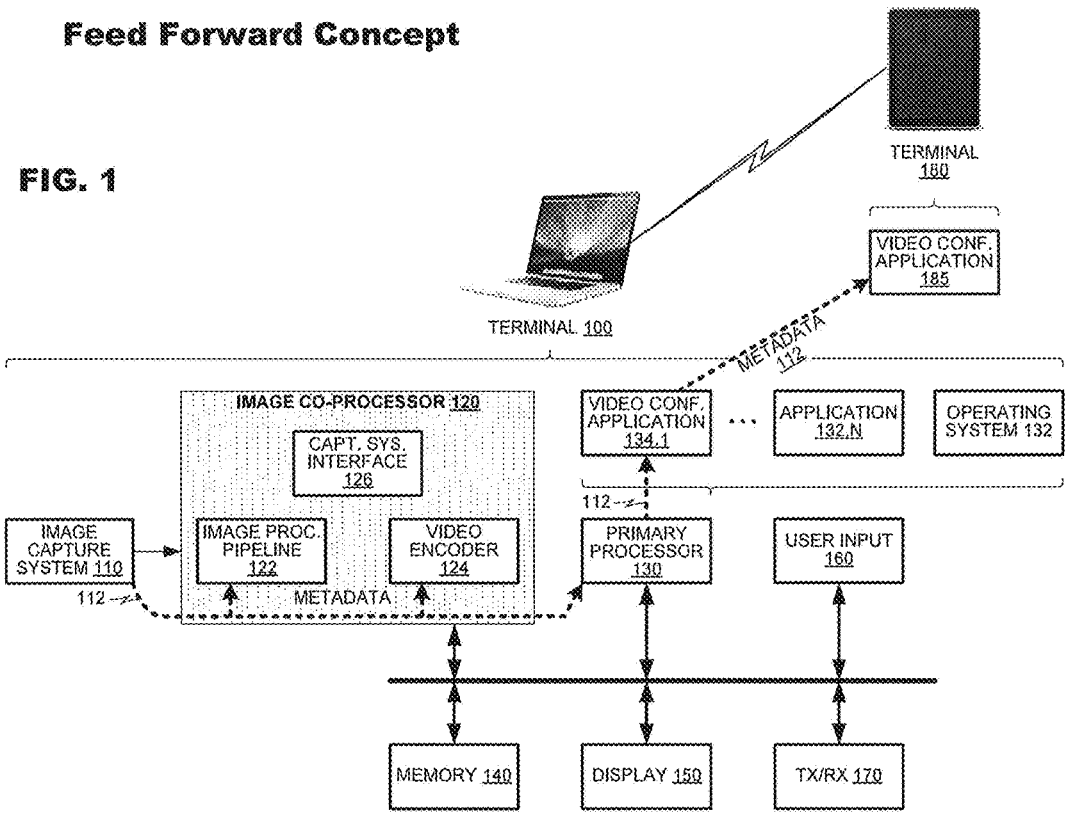
FIG. 1 is a simplified block diagram of a terminal according to an embodiment of the present disclosure.

FIG. 1 is a simplified block diagram of a terminal 100 according to an embodiment of the present disclosure. The terminal 100 may include an image capture system 110, an image co-processor 120, a primary processor 130, a memory 140, a display 150, a user input system 160 and a transceiver 170. The image capture system 110 may generate image data representing a local environment. The image co-processor 120 may process the image data for consumption by other system components, for example, applications executing on the device. It may generate output data which may be stored in the memory 140 for retrieval and consumption by other system components, such as the primary process 130.

As discussed, the image capture system 110 may generate image data within the terminal 100. The image capture system 110 may include one or more image sensors, such as CCD or CMOS image sensors, that generate digital image data. The image capture system 110 also may include an optical system, which may include various lenses, shutters and/or irises, that focus light on the image sensor(s). In this regard, implementations may vary. Some image capture systems may include a fixed optical system for which zoom properties, focus properties and the like are fixed whereas other image capture systems may have more complex optical where zoom, focus and other operational parameters can be controlled during image capture. The image capture system 110 may have a local controller (not shown) that controls parameters of image capture, such as auto-focus and/or auto-exposure control. The image capture system 110 may receive control data from the image co-processor which governs operation of the image sensor(s) and/or controller, as discussed herein.

The primary processor 130 may operate as a central processing unit of the terminal 100. The primary processor 130 may execute program instructions corresponding to an operating system 132 and various applications 134.1-134.N of the terminal 100. The program instructions may be stored in the memory 140 and read to the primary processor 130 for execution. The operating system 132 and applications 134.1-134.N may consume and/or generate data as part of their execution, including data based on the image data generated by the image-coprocessor 120; this data also may be stored in the memory 140.

The memory 140 may be provided as a structured memory system that includes both volatile memory sub-systems and non-volatile memory sub-systems. The memory 140 may include one or more electrical-, magnetic- and/or optical storage devices (not shown).

The display system 150 may render graphical output of the terminal 100. The display system 150 may include a display device such as an LCD or LED display and graphics processing systems such as a graphics processing unit (commonly, a "GPU") and associated memory systems. The display system 150 may output graphical information that may be generated by the operating system 132 and/or applications 134.1-134.N during terminal operation. Such graphical output may include image data generated by the image co-processor 120.

The user input system 160 may capture user commands entered to the terminal 100 by an operator. The user input system 160 may include various input devices, such as buttons, pointer devices, touch screen inputs, speech control sub-systems and the like. During operation, the user input system 160 may receive user commands entered via these input devices, which may be interpreted by the primary processor 130 to govern operation of the operating system 132 and/or applications 134.1-134.N. User commands also may influence operation of the image coprocessor 120.

The transceiver system 170 may manage communication between the terminal 100 and other devices external to the terminal. The transceiver system 170 may include various communication devices, such as wireless transceivers (e.g., WiFi, Bluetooth, and/or cellular communication systems) and wireline transceivers (e.g., Ethernet communication sub-systems), to interface the terminal 100 to communication networks (not shown). The transceiver system 170 may engage these communication networks to effect communication with other devices that may be reached by those networks.

The image co-processor 120 may include an image processing pipeline 122, a video encoder 124 and a capture system interface 126. The image processing pipeline 122 may perform processing operations on the captured image data to condition it for further processing within the system. For example, the image processing pipeline may perform frame rate adaptation, frame resolution adaptation and/or color conversion operations to transform capture image data from a format output by the image capture system 110 to format(s) required by other system components, such as the video encoder 124, the display system 150 and/or applications 134.1-134.N that will process the image data. The image processing pipeline 122 also may perform signal conditioning operations such as filtering (e.g., de-noising filters, sharpening filters, smoothing filters, bilateral filters and the like) that may be applied dynamically to captured mage data based on characteristics observed within the image data.

The video encoder 124 may perform image compression operations on image data input to it from the image capture system 110. The video encoder 124 may code the input image data according to a predetermined coding protocol, such as ITU H.265 (also called "HEVC"), H.264, H.263 or the like. In this regard, the video coder 124 may code input image data according to motion-compensated predictive coding techniques, in which the coder exploits temporal redundancy among frames of image data by searching for prediction matches between blocks of an input frame and blocks of previously-coded frames that are designated as reference frames. The image co-processor 120 may output data in a format that adheres to a format of its selected protocol.

The capture system interface 126 may control operation of the image capture system 110. For example, the capture system interface 126 may set capture settings of the image capture system 110 including, for example, exposure times, F numbers and capture modes (e.g., standard or high dynamic range capture, pixel binning, etc.) of sensor(s) within the image capture system 110. In embodiments where the image capture system 110 possesses a variable zoom optical system, the capture system interface 126 may control lens zoom settings and other parameters of an optical system (not shown) within the image capture system 110.

In many applications, an image capture system 110 may include controllers (not shown) that perform automated image capture control operations, such as auto-exposure processes. In such embodiments, the capture system interface 126 may define a range of exposure settings within which the capture system 110 operates and the capture system's auto-exposure processes may select exposure values within the specified range.

During terminal operation, a variety of components within a terminal 100 and, depending on the application at work in the terminal, other devices 180 outside the terminal 100 will process image data from the image capture system 110. Consider a videoconferencing application, for example. When the terminal 100 executes a videoconferencing application 134.1, it may exchange coded video with another terminal 180 that executes a counterpart video conferencing application 185. Within the terminal 100, the image capture system 110 may generate a stream of video data, which is presented to the image co-processor 120. The image co-processor 120 may perform analysis on the image data to code the video data, the primary processor 130 may execute the application 134.1 which communicates with its counterpart via the terminal's transceiver 170. According to an embodiment, the image processing components, such as the image capture system 110 and image co-processor 120 may generate metadata 112 that other components may use advantageously to improve their operation.

Embodiments of the present disclosure provide techniques for generating metadata by terminal components as they perform their respective operations in handling and forwarding of image information. The metadata may be relayed to downstream components of the terminal 100 located at positions in a distribution path of the image data farther from the source of the image data (the image capture system 110) than they are. Indeed the metadata may be relayed to remote terminals 180 that are separated from the terminal 100 by one or more communication networks. Recipient components may exploit the metadata that they receive as they perform their own operations. When exchanging metadata among terminals 100 and 180, the terminals may employ Supplemental Enhancement Information ("SEI") messages as provided by certain coding protocols, or they may use communication channels that are established out-of-band from the communication protocols that carry coded video data (e.g., communication channels independent of the coded video data).

Such metadata may include:

Image capture hardware identification (such as device ID and model ID) or identifiers of components within the image capture system 110 (e.g., image sensor ID, Lens ID, Focus Motor ID, Flash/Strobe ID and the like);

Resolution (pixel count) of image data output by the image capture system 110;

Pixel size of image data output by the image capture system 110 (dimensions of physical sensor hardware);

Image sensor noise model equation and coefficients (mathematical model of the pixel noise);

Reference image data for correcting sensor- and lens-defects (for example, reference images may include full-resolution- or heavily-compressed-representations);

Exposure parameters of image data output by the image capture system 110, such as analog gain, digital gain, exposure time;

White balance gains and/or color temperature of image data output by the image capture system 110 (scalar- and matrix-representations of color correction parameters);

Focus performance;

Pixel statistics of image data output by the image capture system 110 (pre-computed mathematical representations of the image data contents, including histograms of brightness and color);

Region of Interest geometry generated by applied by the image capture system 110 or the image co-processor 120, including for example:
  Geometry defining 'metering' for auto exposure, auto white balance, focus,
  Geometry defining user-selected portions of the image,
  Geometry defining algorithm-results computed from the image, including the geometry of detected objects, faces, and shapes;

Encryption parameters applied by the image capture system 110 or the image co-processor 120 (for example, public keys or encryption method identifiers);

Video compression parameters applied by the image co-processor 120, for example, algorithm/version identifier, compression profile, and decoding parameters; and/or Binary data representing vendor-specific extensions of the image capture system 110 or the image co-processor 120.

In one embodiment, for example, the image capture system 110 may provide region-of-interest ("ROI") data, identifying spatial regions within image content that are identified as important to the user. ROIs may be determined algorithmically, for example, through the use of a face detection algorithm, a body detection algorithm, shape detection algorithms, character recognition algorithms or a similar object identification algorithm. The ROIs also may be identified by foreground/background discrimination processes or by activity in a center of a field of view. These ROIs may also be user-supplied by commands entered through user input 160 that identify regions of interest in captured image data.

Data regarding ROI(s) in image content may be used by other components to augment their operation. An image processing pipeline 122, for example, may tailor processing operations for different portions of image data based on whether those portions occur within a ROI or not. In one embodiment, the image processing pipeline 122 may alter filtering operations for ROI data and non-ROI data. In another embodiment, the image processing pipeline 122 may utilize ROI metadata 112 to estimate noise in an input image. For example, if statistics indicate the presence of high-frequency information outside of a region-of-interest, the image processing pipeline 122 may estimate that the image as a whole contains a high level of noise.

Similarly, a video encoder 124 may alter coding parameters for different portions of image data based on whether those portions occur within a ROI or not. For example, a video encoder 124 may allocate coding budgets differently for ROI data than non-ROI data, with higher bitrate budgets allocated for the ROI data than the non-ROI data. Such budget allocations may cause the encoder 124 to select different coding parameters for ROI data than non-ROI data. For example, ROI data may have generally lower quantization parameters assigned to it than for non-ROI data. The quantization parameters may cause truncation of data values generated during coding (typically, transform coefficients that are obtained from pixel values) and, by extension, loss of image information; when lower quantization parameters are used, image losses tend to be lower.

Similarly, altering allocations of bitrate budget to different portions of an input image may induce the video encoder 124 to alter coding mode decisions for those portions of the image. For example, inter-coding modes (commonly "I" modes) and unidirectional coding modes ("P" modes) typically provide higher quality coding than other coding modes such as SKIP mode coding or bidirectional coding modes ("B" modes) but at the cost of higher bitrates. When different bitrate budgets are allocated to different portions of an image based on whether those portions belong to ROIs or not, it may alter the coding modes that are assigned to those image portions.

Additionally, altering allocations of bitrate budget to different portions of an input image may induce the video encoder 124 to filter input data more heavily in non-ROI regions, which may reduce high spatial-frequency and temporal-frequency content from those portions. The video encoder 124, however, may not filter input data of the ROI regions as heavily, which may preserve high spatial-frequency and temporal-frequency content from those portions. Thus, when the ROI and non-ROI regions are coded, then decoded, the ROI regions may retain a greater degree of image content than the non-ROT regions.

In a further example, when a video encoder 124 determines that bitrate budgets are difficult to meet when coding a full image, the video encoder 124 may crop image data prior to coding to limit image content to the ROI (with some allocation of a portion of non-ROI data as a border around the ROI) to reduce bitrates of coded data even further.

Additionally, a remote terminal 180 may exploit ROI metadata 112 provided by the image capture system 110. As part of the videoconferencing application, the terminal 180 will decode and display the coded video data it receives from the terminal 100 (decoder not shown). The terminal 180 may provide user controls to permit operators to zoom displayed video data. In response to such a user command, the terminal 180 may zoom in on the area corresponding to the ROI defined in the image capture system metadata 112.

Alternatively, a remote terminal 180 may use ROI metadata 112 to crop image data prior to decode. For example, if a remote terminal 180 encounters an operating condition in which insufficient resources are available to decode coded video data from terminal 100 in its entirety (because, for example, resources are diverted to other applications (not shown)), the remote terminal 180 may distinguish coded video data that belongs to ROT data from coded video data that belongs to non-ROI data. The ROI metadata 112 may be carried in the SEI or out-of-band channels discussed above. The remote terminal 180 may decode coded video data belonging to the ROI data and omit decoding of video data of non-ROI data, except perhaps where appropriate to display decoded non-ROI data as a border around the ROI or where necessary to develop prediction references for other ROI data. In this manner, the decoding terminal 180 may "crop" decoded video data to the ROI data in a manner similar to cropping at the video encoder 124.

In another embodiment, a process within the terminal may exploit ROI data during processing for secure communication. For example, during encrypted communication, a terminal 100 may encrypt a portion of an image designated as an ROI and communicate the encrypted ROI data to secure recipients. The application also may blur or pixelate ROI data for transmissions in the "open." A secure receiver that can access the encrypted data may decrypt the ROI data and build a composite image from the data transmitted in the open and the decrypted ROI data whereas a non-secure receive would be able to recover only the pixelated data transmitted in the open. Such use cases find application for example, in document scanning applications.

In another embodiment, the image capture system 110 may provide in metadata 112 statistics related to image content of the image. Such statistics may include histograms of image brightness and/or color, local (spatially-varying) statistics of pixel variances, identification of edges in the image data, and/or estimates of noise in the image data. During operation, as the image capture system 110 encounters changes in image content, for example, changes in the camera's field of view or a change in brightness of content, such changes may be reflected in the metadata 112 output to other components.

Components of the terminal 100 may exploit the statistical data in their operations. For example, the video encoder 124 may employ use of spatially-varying encoder parameters, including spatially-varying quantization tables, based on statistics provided by the image capture system 110. Alternatively, if statistics indicate the presence of high-frequency information outside of a region-of-interest, the video encoder 124 may estimate that the image is noisy and, in response, the video encoder 124 may reduce its bitrate budget. Reduction of the bitrate budget may cause the video coder 124 to filter input data more heavily than otherwise, which may reduce high spatial-frequency and temporal-frequency content from the input image. In this fashion, metadata 112 from the image capture system 100 may induce the video encoder 124 to perform additional noise-reduction processes.

User commands may influence operation of the image capture system 110. For example, a user may select an ROI for focus or for exposure. In response to the user command, the image co-processor 120 may adjust its internal control algorithms based on the region of interest. Additionally user commands may specify algorithmic changes, such as sharpening, brightening, and color adjustment, which also may causes the image co-processor 120 to adjust its algorithms and pixel-processing software. In another embodiment, user commands may invoke a hardware actuation, such as commanding a Focus Sweep or a Flash Photograph, which may cause the image co-processor 120 to execute software that controls those hardware features (e.g., the focus motor, camera-flash/illuminator/light/strobe).

Figure 2:
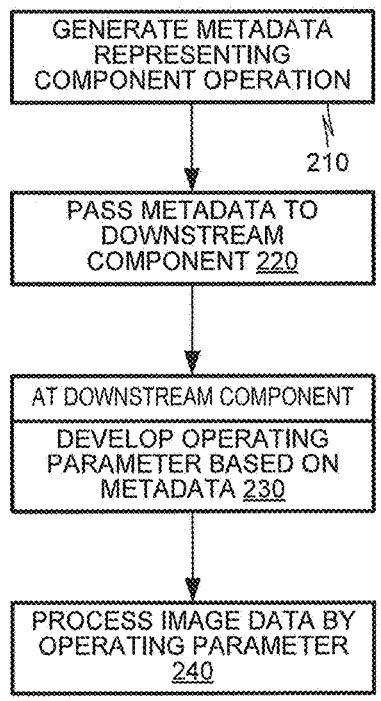
FIG. 2 illustrates a method according to an embodiment of the present disclosure.

FIG. 2 illustrates a method 200 according to an embodiment of the present disclosure. The method 200 may begin by generating metadata at a component of an image distribution pipeline representing operation of the component (box 210). The method 200 may pass the metadata to a downstream component of the image distribution pipeline (box 220). Then, at a downstream component of the image distribution pipeline, the method 200 may develop operating parameters of the downstream component based on the metadata (box 230). The method may process the image data at the downstream component using the developed operating parameters (box 240).

Figure 3:
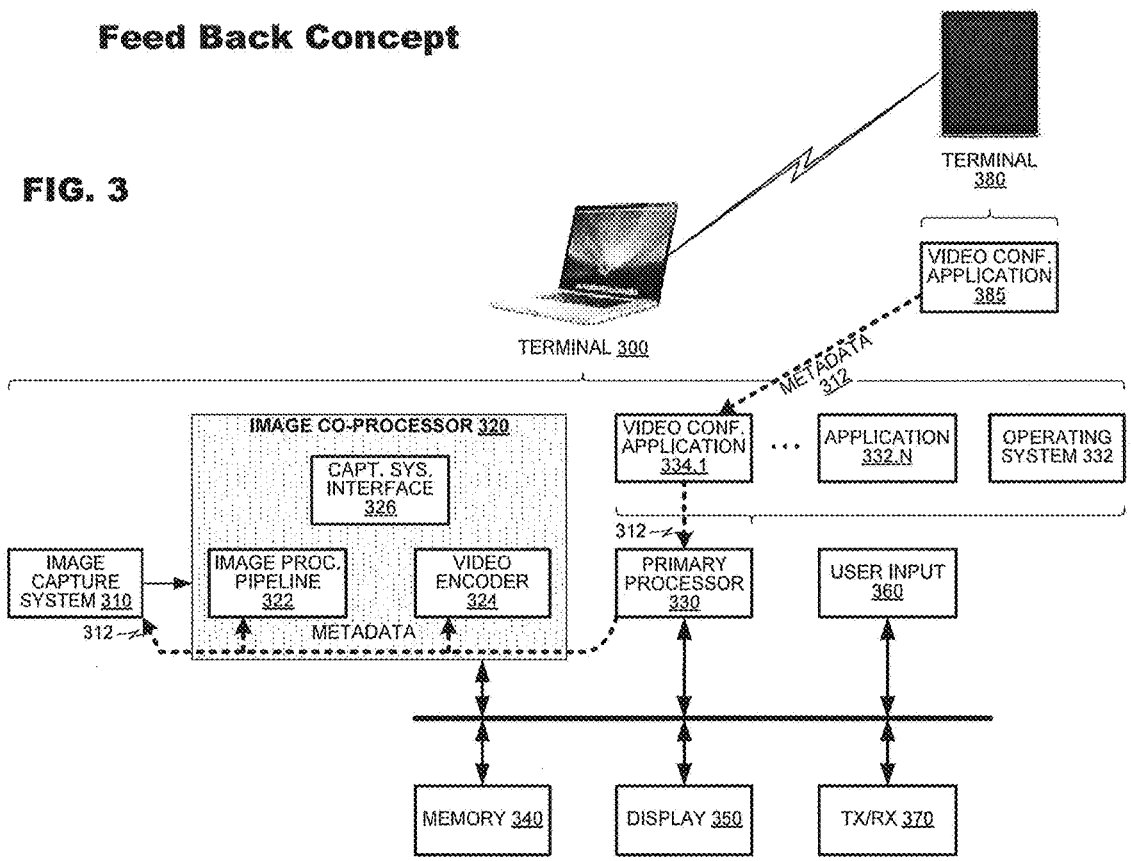
FIG. 3 is a simplified block diagram of a terminal according to an embodiment of the present disclosure.

FIG. 3 is a simplified block diagram of a terminal 300 according to an embodiment of the present disclosure. The terminal 300 may include an image capture system 310, an image co-processor 320, a primary processor 330, a memory 340, a display 350, a user input system 360 and a transceiver 370. The image capture system 310 may generate image data representing a local environment. The image co-processor 320 may process the image data for consumption by other system components, for example applications executing on the device. It may generate output data which may be stored in the memory 340 for retrieval and consumption by other system components, such as the primary process 330.

As discussed, the image capture system 310 may generate image data within the terminal 300. The image capture system 310 may include one or more image sensors, such as CCD or CMOS image sensors, that generate digital image data. The image capture system 310 also may include an optical system, which may include various lenses, shutters and/or irises, that focus light on the image sensor(s). In this regard, implementations may vary. Some image capture systems may include a fixed optical system for which zoom properties, focus properties and the like are fixed whereas other image capture systems may have more complex optical where zoom, focus and other operational parameters can be controlled during image capture. The image capture system 310 may have a local controller (not shown) that controls parameters of image capture, such as auto-focus and/or auto-exposure control. The image capture system 310 may receive control data from the image co-processor which governs operation of the image sensor(s) and/or controller.

The primary processor 330 may operate as a central processing unit of the terminal 300. The primary processor 330 may execute program instructions corresponding to an operating system 332 and various applications 334.1-334.N of the terminal 300. The program instructions may be stored in the memory 340 and read to the primary processor 330 for execution. The operating system 332 and applications 334.1-334.N may consume and/or generate data as part of their execution, including data based on the image data generated by the image-coprocessor 320; this data also may be stored in the memory 340.

The memory 340 may be provided as a structured memory system that includes both volatile memory sub-systems and non-volatile memory sub-systems. The memory 340 may include one or more electrical-, magnetic- and/or optical storage devices (not shown).

The display system 350 may render graphical output of the terminal 300. The display system 350 may include a display device such as an LCD or LED display and graphics processing systems such as a GPU and associated memory systems. The display system 350 may output graphical information that may be generated by the operating system 332 and/or applications 334.1-334.N during terminal operation. Such graphical output may include image data generated by the image co-processor 320.

The user input system 360 may capture user commands entered to the terminal 300 by an operator. The user input system 360 may include various input devices, such as buttons, pointer devices, touch screen inputs, speech control sub-systems and the like. During operation, the user input system 360 may receive user commands entered via these input devices, which may be interpreted by the primary processor 330 to govern operation of the operating system 332 and/or applications 334.1-334.N. User commands also may influence operation of the image coprocessor 320.

The transceiver system 370 may manage communication between the terminal 300 and other devices external to the terminal. The transceiver system 370 may include various communication devices, such as wireless transceivers (e.g., WiFi, Bluetooth, and/or cellular communication systems) and wireline transceivers (e.g., Ethernet communication sub-systems), to interface the terminal 300 to communication networks (not shown). The transceiver system 370 may engage these communication networks to effect communication with other devices that may be reached by those networks, for example, a remote device 380. In an embodiment, commands entered by a user of the remote device 380 may control operation of applications 334.1-334.N and/or the image coprocessor 320.

The image co-processor 320 may include an image processing pipeline 322, a video encoder 324, and a capture system interface 326. The image processing pipeline 322 may perform processing operations on the captured image data to condition it for further processing within the system. For example, the image processing pipeline may perform frame rate adaptation, frame resolution adaptation and/or color conversion operations to transform capture image data from a format output by the image capture system 310 to format(s) required by other system components, such as the video encoder 324, the display system 350 and/or applications 334.1-334.N that will process the image data. The image processing pipeline 322 also may perform signal conditioning operations such as filtering (e.g., de-noising filters, sharpening filters, smoothing filters, bilateral filters and the like) that may be applied dynamically to captured mage data based on characteristics observed within the image data.

The video encoder 324 may perform image compression operations on image data input to it from the image capture system 310. The video encoder 324 may code the input image data according to a predetermined coding protocol, such as ITU H.265, H.264, H.263 or the like. In this regard, the video coder 324 may code input image data according to motion-compensated predictive coding techniques, in which the coder exploits temporal redundancy among frames of image data by searching for prediction matches between blocks of an input frame and blocks of previously-coded frames that are designated as reference frames. The image co-processor 320 may output data in a format that adheres to a format of its selected protocol.

The capture system interface 326 may control operation of the image capture system 310. For example, the capture system interface 326 may set capture settings of the image capture system 310 including, for example, exposure times, F numbers and capture modes (e.g., standard or high dynamic range capture, pixel binning, etc.) of sensor(s) within the image capture system 310. In embodiments where the image capture system 310 possesses a variable zoom optical system, the capture system interface 326 may control lens zoom settings and other parameters of an optical system (not shown) within the image capture system 310.

In many applications, an image capture system 310 may include controllers (not shown) that perform automated image capture control operations, such as auto-exposure processes. In such embodiments, the capture system interface 326 may define a range of exposure settings within which the capture system 310 operates and the capture system's auto-exposure processes may select exposure values within the specified range.

During terminal operation, a variety of components within a terminal 300 and, depending on the application at work in the terminal, other devices 380 outside the terminal 300 will process image data from the image capture system 310. Consider a videoconferencing application, for example. When the terminal 300 executes a videoconferencing application 334.1, it may exchange coded video with another terminal 380 that executes a counterpart video conferencing application 385. Within the terminal 300, the image capture system 310 may generate a stream of video data, which is presented to the image co-processor 320. The image co-processor 320 may perform analysis on the image data to code the video data, the primary processor 330 may execute the application 334.1 which communicates with its counterpart via the terminal's transceiver 370.

The embodiment of FIG. 3 may provide a feedback path that provides metadata 312 from "downstream components," components that are farther removed from an image source, to "upstream components" that are closer to the source of image data (image capture system 310). The metadata 312 may provide information regarding operational state of the downstream components, which the upstream components may use to alter their operational state.

In one embodiment, metadata 312 may be generated within the terminal 300 identifying a frame rate of coded video data that is communicated across a network to the remote terminal 380. During operation, a video conferencing application 334.1 may alter a frame rate of coded data that is transmitted to a remote terminal 380. Frame rate alteration may be performed in response to changes in network bandwidth, to reports of communication errors and the like. Typically, an application 334.1 may perform frame rate alteration by dropping coded frames from a transmission queue before transmission. Frames are eligible to be dropped when they are non-reference frames, that is, when no other coded frame relies on the frame to be dropped as a prediction reference.

When a video conferencing application 334.1 performs frame dropping, it may generate metadata 312 that indicates an effective frame rate that is transmitted to the remote terminal 380. An image capture system 310 and/or an image co-processor 320 may utilize the effective frame rate information to alter their operations. For example, a video encoder 324 may have a certain number of frames input to it that are not coded when the metadata 312 is received. In response, the video encoder 324 may perform frame decimation to match the rate of frames to be coded to the new effective frame rate. If for example, the video encoder 324 had been coding frames at a 30 fps rate but the video conferencing application 334.1 dropped the effective frame rate to 15 fps, the video encoder 324 may remove uncoded frames from its internal buffer to match the new 15 fps rate.

The image capture system 310 also may alter operation based on new effective frame rate data. The image capture system 310 may alter the rate at which it generates image data to match the effective frame rate. As a result, the image capture system 310 may increase exposure times used by pixel circuits within image sensor(s) within the image capture system 310 to capture image data. Increasing the exposure times of pixel circuits tends to improve signal to noise ratios of image signals output by the pixel circuits, particularly in low light imaging applications. Thus, an image capture system 310 may use metadata 312 identifying an effective transmitted frame rate to improve image capture functions within the image capture system 310.

In another embodiment, a remote terminal 380 may provide metadata 312 to a terminal 300 identifying an effective frame rate of decoded video data as it is displayed at the remote terminal 380. As discussed above, a remote terminal 380 may encounter resource contention issues which cause loss of resources that are available for video decode operations. In response, a remote terminal 380 also may perform frame rate conversion, in which it drops coded frames prior to decode. In this manner, the effective frame rate may drop from a level that had been used when the image capture system 310 generated image data and when the video encoder 324 coded the image data.

The video conferencing application 385 of the remote terminal 380 may provide effective frame rate data to the video conferencing application 334.1, and the video conferencing application 334.1 may provide the effective frame rate data in metadata 312 to the image co-processor 320 and/or the image capture system 310. The image capture system 310 may alter its image capture rate to match the effective frame rate reported by the remote terminal 380 in a manner similar to that described above where the image capture system 310 alters its image capture rate to match an effective frame rate of transmission by the video conferencing application 334.1. Similarly, the video encoder 324 may perform frame decimation as appropriate to match a frame rate of queued images that await coding to the effective frame rate reported by the remote terminal 380.

In another embodiment, a remote terminal 380 may identify in metadata 312 an effective resolution of image data rendered at the terminal 380. Decoding terminals, for example, may resize decoded images to match characteristics of display devices at the terminals or when image data is displayed in windows that occupy only a portion of larger display resource (for example, an inset window). In such scenarios, the remote terminal 380 may provide information to the video conferencing application 334.1 at the terminal 300 identifying an effective size of displayed images at the terminal 380. The video conferencing application 334.1 may provide the information to the image capture system 310 and/or the image co-processor 320.

In an embodiment, the image co-processor 320 may alter parameters of image capture according to the effective resolution identified in metadata 312. For example, the image co-processor 320 may configure the image capture system 310 to engage a pixel binning mode, in which output from adjacent pixels are combined during readout, prior to digitization. For example, a 2×2 array of pixels may be controlled to act as a single "binned pixel." When an image sensor operates pixels in a binned mode, the sensor may generate pixel output that have improved signal to noise ratio as compared to a mode in which all pixels operate individually. The sensor's output, however, will have reduced resolution (for example, a four-fold decrease in resolution when 2×2 arrays of pixel are binned together).

Thus, the image co-processor 320 may determine, based on the effective resolution reported in the metadata 312, whether the resolution of captured images obtained in a binned mode will meet or exceed the effective resolution. If so, the image co-processor 320 may configure the image capture system 310 to engage the pixel binning mode and output data with pixel counts that better match those of the remote device 380.

In another embodiment, metadata 312 may be provided directly to the image capture system 310, and a control process in the image capture system 310 may make the determination when to pixel binning modes to match to effective resolutions reported in the metadata 312.

The image co-processor 320 also may alter operation to match image resolution to the effective resolution of the remote terminal 380. The image processing pipeline 322 may downscale image data received from the image capture system 310 (whether or not binned) to match the effective resolution of the remote terminal 380. In doing so, the image processing pipeline 322 may conserve resources by preventing computational workloads related to the processing and video coding of pixels that would have been discarded by components of the remote terminal 380.

In another embodiment, a remote terminal 380 may identify in metadata 312 a cropping operation performed on image data rendered at the terminal 380. Decoding terminals, for example, may crop display of decoded images in circumstances, for example, where users cause a zoom of displayed decoded video data. As part of the zoom operation, video data belonging to peripheral portions of the decoded video data may not be displayed because the zoom causes those portions to fall outside a displayable area available for rendering of the decoded video data. Limits of the displayable area may define a region where the decoded video data effectively is cropped. The remote terminal 380 may report the cropping operation to the video conferencing application 334.1 in metadata 312, which may provide the cropping operation to the image capture system 310 and/or the image co-processor.

An image capture system 310 may respond to cropping information by altering its image capture operations. In implementations in which the image capture system 310 possesses optical systems with variable zoom lenses, the image capture system 310 may alter parameters to match zoom of its optical system to a zoom level reported in the metadata 312. In implementations in which the image capture system 310 possess a fixed zoom optical system, the image capture system 310 may employ digital zoom techniques effectively cropping captured image data before it is output to the image co-processor 320. In practice, it may be convenient to identify a field of view that corresponds the cropping information reported by the remote device 380, and then set capture settings to widen the field of view incrementally (say, by 10%). In this manner, captured image data will contain a wider field of view than is used at the remote terminal 380; if user controls at the remote terminal 380 enlarge the cropping window, sufficient additional information may be present in the coded video data that is delivered to remote terminal 380 to begin decode and rendering of the enlarged window immediately. As new metadata reports are received from the remote device 380 reflecting the enlarged cropping window, the image capture system 310 may respond accordingly.

In another embodiment, a remote terminal 380 may employ metadata 312 to identify mode transitions, request compression parameters, request compression algorithms or compression protocols. A video conferencing application 334.1 may pass this information to the image co-processor 320 in metadata 312. In response, the video encoder 324 may alter its coding operations to match its coding operations to the parameters, algorithms, and/or protocols that are requested by the terminal 380.

In an embodiment, a remote terminal 380 may employ metadata 312 to establish parameters of an encryption process to be performed by the image co-processor 320. For example, the remote terminal 380 and the image co-processor 320 may exchange data identifying a type of encryption to be performed and keys to be utilized for encryption. The image co-processor 320 may perform encryption of video data to be transmitted to the remote terminal 380, which protects the video data from eavesdropping by other components within the terminal 300 itself.

Metadata 312 also may provide direct control of the image capture system 310 by a remote device. For example, the metadata 312 may specify parameters of image sensor gain, focus motor positions and/or camera flash or strobe settings to be used during image capture. The metadata 312 may propagate back to the image co-processor 320 and further to the image capture system 310 to set parameters of its operation.

In a further embodiment, the remote terminal 380 provide in metadata 312 an identification of an ROI as identified through user input entered at the remote terminal 380. An ROI may be identified from user interaction with rendered video, coupled with object detection. For example, a user may zoom to an area of displayed video or may enter a command such as a "touch to focus command" that identifies a spatial area that contains image content of interest to the user. The remote device 380 may perform ROI detection upon image content in the selected region to identify content that corresponds to an ROI. As in the embodiment of FIG. 1, ROIs may be determined algorithmically, for example, through the use of a face detection algorithm, a body detection algorithm, shape detection algorithms, character recognition algorithms or a similar object identification algorithm. ROIs also may be identified by foreground/background discrimination processes or by identifying regions of activity within the user-selected region.

Data regarding ROI(s) components in the first terminal 300 to augment their operation. An image capture system 310 may respond to ROI information by altering its image capture operations to develop a field of view commensurate with a size of the ROI. In implementations in which the image capture system 310 possesses optical systems with variable zoom lenses, the image capture system 310 may set zoom settings to capture the ROI reported in the metadata 312. In implementations in which the image capture system 310 possess a fixed zoom optical system, the image capture system 310 may employ digital zoom techniques effectively cropping captured image data about the ROI before it is output to the image co-processor 320. Again, in practice, it may be convenient to set capture settings to widen the field of view incrementally beyond a size of the ROI (say, by 10%). In this manner, captured image data will contain a wider field of view than is used at the remote terminal 380; if user commands cause the remote terminal 380 to zoom away from the ROI. As new metadata reports are received from the remote device 380 reflecting different zoom settings, the image capture system 310 may respond accordingly.

An image processing pipeline 322 also may respond to ROI identification by a remote terminal by altering its coding operations. In one embodiment, the image processing pipeline 322 may alter filtering operations for ROI data and non-ROI data. In another embodiment, the image processing pipeline 322 may utilize ROI metadata 312 to estimate noise in an input image. For example, if statistics indicate the presence of high-frequency information outside of a region-of-interest, the image processing pipeline 322 may estimate that the image as a whole contains a high level of noise.

Similarly, a video encoder 324 may alter coding parameters for different portions of image data based on whether those portions occur within a ROI or not. For example, a video encoder 324 may allocate coding budgets differently for ROI data than non-ROI data, with higher bitrate budgets allocated for the ROI data than the non-ROI data. Such budget allocations may cause the encoder 324 to select different coding parameters for ROI data than non-ROI data. For example, ROI data may have generally lower quantization parameters assigned to it than for non-ROI data. The quantization parameters may cause truncation of data values generated during coding (typically, transform coefficients that are obtained from pixel values) and, by extension, loss of image information; when lower quantization parameters are used, image losses tend to be lower.

Similarly, altering allocations of bitrate budget to different portions of an input image may induce the video encoder 324 to alter coding mode decisions for those portions of the image. As discussed in connection with FIG. 1, when different bitrate budgets are allocated to different portions of an image based on whether those portions belong to ROIs or not, it may alter the coding modes that are assigned to those image portions.

Additionally, altering allocations of bitrate budget to different portions of an input image may induce the video encoder 324 to filter input data more heavily in non-ROI regions, which may reduce high spatial-frequency and temporal-frequency content from those portions. The video encoder 324, however, may not filter input data of the ROI regions as heavily, which may preserve high spatial-frequency and temporal-frequency content from those portions. Thus, when the ROI and non-ROI regions are coded, then decoded, the ROI regions may retain a greater degree of image content than the non-ROI regions.

In a further example, when a video encoder 324 determines that bitrate budgets are difficult to meet when coding a full image, video encoder 324 may crop image data prior to coding to limit image content to the ROI to reduce bitrates of coded data even further (unless cropping already was performed by the image capture system 310).

User commands may influence operation of the image capture system 310. For example, a user may select an ROI for focus or for exposure. In response to the user command, the image co-processor 320 may adjust its internal control algorithms based on the region of interest. Additionally user commands may specify algorithmic changes, such as sharpening, brightening, and color adjustment, which also may causes the image co-processor 320 to adjust its algorithms and pixel-processing software. In another embodiment, user commands may invoke a hardware actuation, such as commanding a Focus Sweep or a Flash Photograph, which may cause the image co-processor 320 to execute software that controls those hardware features (e.g., the focus motor, camera-flash/illuminator/light/strobe).

Figure 4:
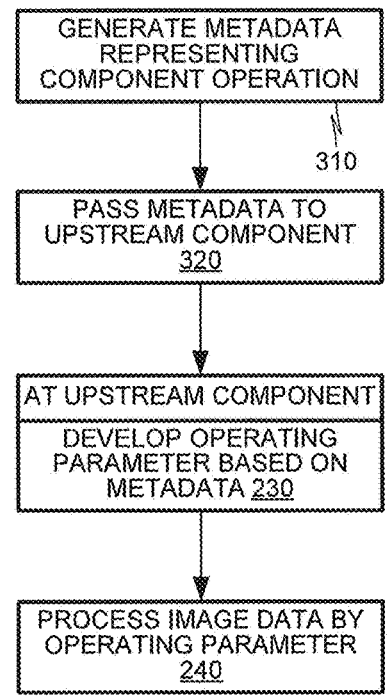
FIG. 4 illustrates a method according to an embodiment of the present disclosure.

FIG. 4 illustrates a method 400 according to an embodiment of the present disclosure. The method 400 may begin by generating metadata at a component of an image distribution pipeline representing operation of the component (box 410). The method 400 may pass the metadata to an upstream component of the image distribution pipeline (box 420). Then, at an upstream component of the image distribution pipeline, the method 400 may develop operating parameters of the upstream component based on the metadata (box 430). The method may process the image data at the upstream component using the developed operating parameters (box 440).

Figure 5:
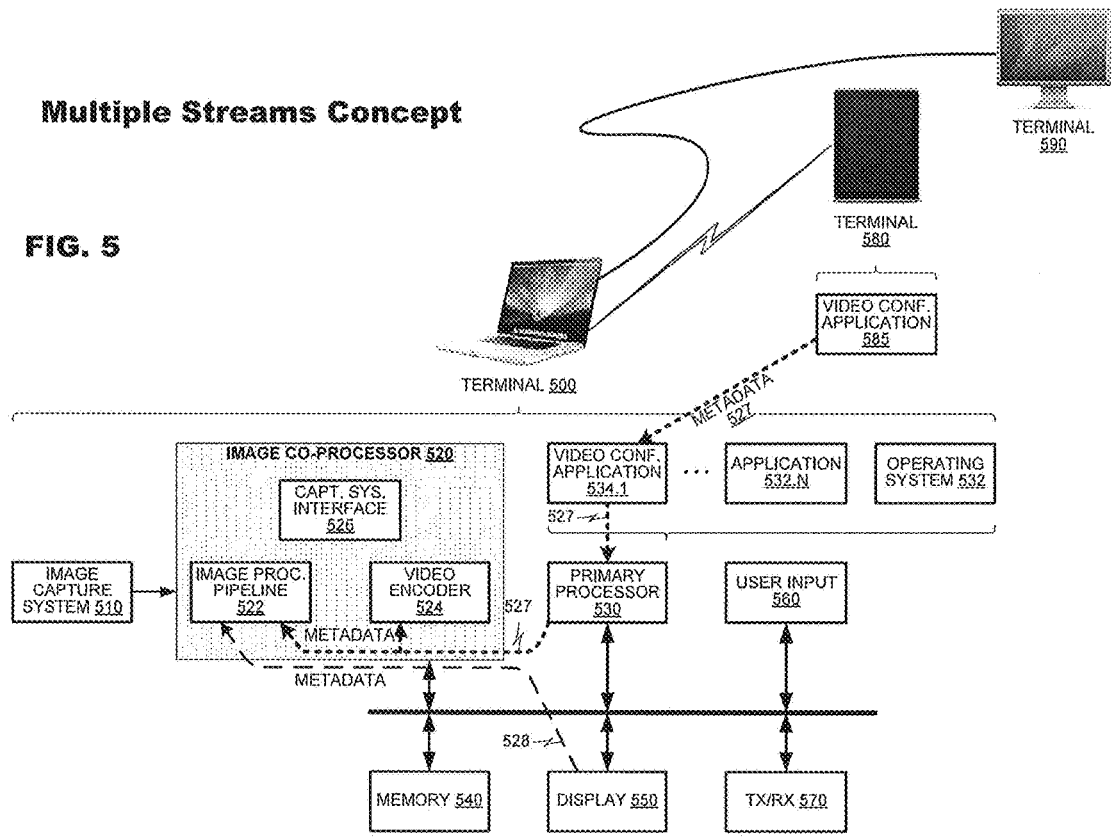
FIG. 5 is a simplified block diagram of a terminal according to an embodiment of the present disclosure.

FIG. 5 is a simplified block diagram of a terminal 500 according to an embodiment of the present disclosure. The terminal 500 may include an image capture system 510, an image co-processor 520, a primary processor 530, a memory 540, a display 550, a user input system 560 and a transceiver 570. The image capture system 510 may generate image data representing a local environment. The image co-processor 520 may process the image data for consumption by other system components, for example applications executing on the device. It may generate output data which may be stored in the memory 540 for retrieval and consumption by other system components, such as the primary process 530.

As discussed, the image capture system 510 may generate image data within the terminal 500. The image capture system 510 may include one or more image sensors, such as CCD or CMOS image sensors, that generate digital image data. The image capture system 510 also may include an optical system, which may include various lenses, shutters and/or irises, that focus light on the image sensor(s). In this regard, implementations may vary. Some image capture systems may include a fixed optical system for which zoom properties, focus properties and the like are fixed whereas other image capture systems may have more complex optical where zoom, focus and other operational parameters can be controlled during image capture. The image capture system 510 may have a local controller (not shown) that controls parameters of image capture, such as auto-focus and/or auto-exposure control. The image capture system 510 may receive control data from the image co-processor which governs operation of the image sensor(s) and/or controller.

The primary processor 530 may operate as a central processing unit of the terminal 500. The primary processor 530 may execute program instructions corresponding to an operating system 532 and various applications 534.1-534.N of the terminal 500. The program instructions may be stored in the memory 540 and read to the primary processor 530 for execution. The operating system 532 and applications 534.1-534.N may consume and/or generate data as part of their execution, including data based on the image data generated by the image-coprocessor 520; this data also may be stored in the memory 540.

The memory 540 may be provided as a structured memory system that includes both volatile memory sub-systems and non-volatile memory sub-systems. The memory 540 may include one or more electrical-, magnetic- and/or optical storage devices (not shown).

The display system 550 may render graphical output of the terminal 500. The display system 550 may include a display device such as an LCD or LED display and graphics processing systems such as a GPU and associated memory systems. The display system 550 may output graphical information that may be generated by the operating system 532 and/or applications 534.1-534.N during terminal operation. Such graphical output may include image data generated by the image co-processor 520.

The user input system 560 may capture user commands entered to the terminal 500 by an operator. The user input system 560 may include various input devices, such as buttons, pointer devices, touch screen inputs, speech control sub-systems and the like. During operation, the user input system 560 may receive user commands entered via these input devices, which may be interpreted by the primary processor 530 to govern operation of the operating system 532 and/or applications 534.1-534.N. User commands also may influence operation of the image coprocessor 520.

The transceiver system 570 may manage communication between the terminal 500 and other devices external to the terminal. The transceiver system 570 may include various communication devices, such as wireless transceivers (e.g., WiFi, Bluetooth, and/or cellular communication systems) and wireline transceivers (e.g., Ethernet communication sub-systems), to interface the terminal 500 to communication networks (not shown). The transceiver system 570 may engage these communication networks to effect communication with other devices that may be reached by those networks.

The image co-processor 520 may include an image processing pipeline 522, a video encoder 524 and a capture system interface 526. The image processing pipeline 522 may perform processing operations on the captured image data to condition it for further processing within the system. For example, the image processing pipeline may perform frame rate adaptation, frame resolution adaptation and/or color conversion operations to transform capture image data from a format output by the image capture system 510 to format(s) required by other system components, such as the video encoder 524, the display system 550 and/or applications 534.1-534.N that will process the image data. The image processing pipeline 522 also may perform signal conditioning operations such as filtering (e.g., de-noising filters, sharpening filters, smoothing filters, bilateral filters and the like) that may be applied dynamically to captured mage data based on characteristics observed within the image data.

In an embodiment, the image co-processor 520 may process input image data in independent, parallel processes for different applications in the terminal 500. For example, a first process may generate a high-quality video for local preview at the terminal 500 and a second process may generate lower-quality video, which is coded for delivery to a remote terminal 580. Processing parameters for each stream may be optimized for the application that will consume the respective stream of image data.

In such an embodiment, the processing pipeline 522 may include a plurality of processing stages that may be time-shared for processing of multiple streams. For example, the processing stages may be configured for processing of one instance of video data for use in compression and they may be configured for processing of a second instance of the video for use in local rendering or for encrypted communication with a remote device. Alternatively, the processing pipeline 522 may include multiple sets of processing stages for parallel processing.

The video encoder 524 may perform image compression operations on image data input to it from the image capture system 510. The video encoder 524 may code the input image data according to a predetermined coding protocol such as ITU H.265, H.264, H.263 or the like. In this regard, the video coder 524 may code input image data according to motion-compensated predictive coding techniques, in which the coder exploits temporal redundancy among frames of image data by searching for prediction matches between blocks of an input frame and blocks of previously-coded frames that are designated as reference frames. The image co-processor 520 may output data in a format that adheres to a format of its selected protocol.

The capture system interface 526 may control operation of the image capture system 510. For example, the capture system interface 526 may set capture settings of the image capture system 510 including, for example, exposure times, F numbers and capture modes (e.g., standard or high dynamic range capture, pixel binning, etc.) of sensor(s) within the image capture system 510. In embodiments where the image capture system 510 possesses a variable zoom optical system, the capture system interface 526 may control lens zoom settings and other parameters of an optical system (not shown) within the image capture system 510.

In many applications, an image capture system 510 may include controllers (not shown) that perform automated image capture control operations, such as auto-exposure processes. In such embodiments, the capture system interface 526 may define a range of exposure settings within which the capture system 510 operates and the capture system's auto-exposure processes may select exposure values within the specified range.

During terminal operation, a variety of components within a terminal 500 and, depending on the application at work in the terminal, other devices 580 outside the terminal 500 will process image data from the image capture system 510. Consider a videoconferencing application, for example. When the terminal 500 executes a videoconferencing application 534.1, it may exchange coded video with another terminal 580 that executes a counterpart video conferencing application 585. Within the terminal 500, the image capture system 510 may generate a stream of video data, which is presented to the image co-processor 520. The image co-processor 520 may perform analysis on the image data to code the video data, the primary processor 530 may execute the application 534.1 which communicates with its counterpart via the terminal's transceiver 570.

As discussed, an image co-processor 520 in the embodiment of FIG. 5 may create multiple parallel streams from a stream of input image data and process them by operations that are tailored to the application for which those streams will be consumed. For example, one stream may be coded for delivery to a remote terminal 580 over a best-effort network, where levels of communication bandwidth and error rates cannot be controlled. A second stream may be delivered to a local display 550 of the terminal 500 where bandwidth and error rates are controlled. A third stream may be delivered to an external display 590 over a wireline network that has a bandwidth that exceeds the communication bandwidth between the terminal 500 and the remote terminal 580 and a lower error rate but has lower bandwidth and higher error rates than the internal communication between the image co-processor 520 and the terminal's own display 550. Video data may be processed by different compression protocols based on the protocols that are supported by the different devices, for example, the remote terminal 580 and/or the external display 590.

In such an embodiment, the image co-processor 520 may receive metadata 527, 528 relating to each of the streams (for convenience, metadata from the external display 590 is not illustrated in FIG. 5). The image co-processor 520 may alter operations of its processes based on the metadata 527, 528 that it receives for the respective streams.

For example, the image co-processor 520 may receive metadata 527 from the remote terminal 580 that describes effective frame rates at the remote terminal 580, cropping operations employed by the remote terminal 580, regions of interest identified by the remote terminal 580 and the like. Such operations are described hereinabove in connection with the embodiment of FIG. 5. According to an embodiment, the image co-processor 520 may employ techniques such as those described in connection with FIG. 2 to alter processing of image data destined to the remote terminal 580 in response to metadata 527 received from the remote terminal 580. Similarly, the image processor 520 may respond to metadata 527 received from the video conferencing application 524.1 regarding frame dropping or other operations employed by the video conferencing application 534.1 upon data destined for delivery to the remote terminal 580 according to the processes described in connection with FIG. 2. For example, the image co-processor 520 may make adjustments to encoder parameters, including the encoding algorithm, the encoder profile, and may make spatial variations to encoding parameters in response to metadata received from downstream components.

In parallel, the image co-processor 520 may respond to metadata 528 generated by the display 550 by altering processing operations applied to image data destined for the display 550. For example, display devices often include sensors to detect and/or classify ambient light at the display device. The image co-processor 520 may alter processing operations applied to image data, for example, by altering image brightness, image white balance, and/or dynamic range of image content in response to changing lighting conditions. Alternatively, such metadata 528 may be provided by an operating system 532 of the terminal 500 (path not shown), which may identify, for example, an effective size of a display window in which the image stream will be displayed; the image co-processor 520 may rescale and/or crop image data to suit the size of the display window. The image co-processor 520 may identify regions of interest in the image data as part of the rescaling/cropping operations.

The image co-processor 520 may alter operations for other data streams that it creates from image data. Thus, the image co-processor 520 may alter operations that it performs on image data destined for the external display 590 in response to metadata (not shown) that it receives representing operating conditions at work at the external display 590.

As with the prior embodiments, image processing operations for the parallel image streams may be performed by an image co-processor 520 that is separate from a central processor 530 of the terminal 500. Thus, these image processing operations, which typically are computationally expensive due to the high frame rates of input image data (often in excess of 24 fps) and high pixel counts within each frame (often in excess of 1 million pixels), may be offloaded from the central processor 530. Thus, the terminal 500 may perform all analysis, control, and compression operations associated with multiple, parallel streams of image data, and it may respond to changing operating conditions at consumers of those streams, with minimal impact on operation of the central processor 530.

Figure 6:
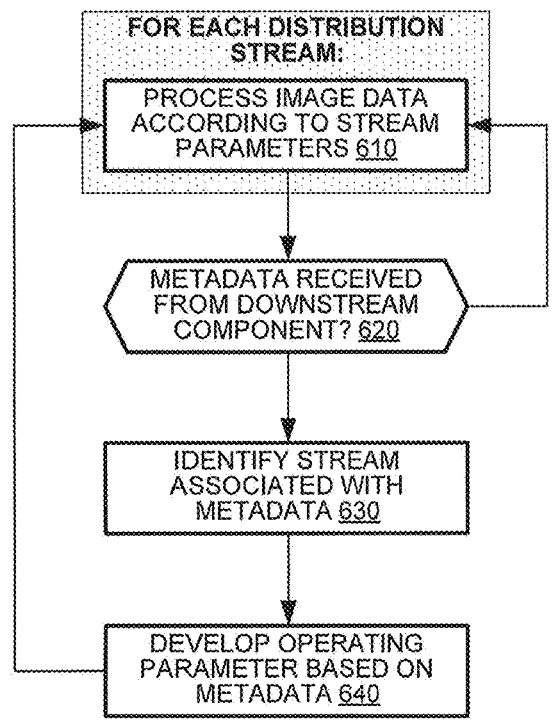
FIG. 6 illustrates a method according to an embodiment of the present disclosure.

FIG. 6 illustrates a method 600 according to an embodiment of the present disclosure. The method 600 may process image data in a plurality of distribution streams. For each distribution stream, the method 600 may process the image data according to parameters of that stream (box 610). During processing, the method 600 may determine if metadata was received from a downstream component (box 620). If so, the method 600 may identify the stream to which the received metadata corresponds (box 630), and it may develop operating parameters for the stream based on the metadata (box 230). Thereafter, the method 600 may return operation to box 610 and process the image data of the distribution streams according to their respective operating parameters. Processes applied to other distribution streams, streams for which the metadata is not related, may continue unchanged.

In an embodiment, received metadata associated with a single stream may cause the image co-processor to adjust operational parameters of the image capture system, which will alter image data input to both processing streams within an image co-processor. An image co-processor may respond by altering operation of processes for the complementary stream(s), the stream(s) to which the received metadata does not relate, to counter-act the changed operational parameters of the image capture system.

The foregoing description has described metadata and control pathways among components of terminals that handle image data that operate in both feed forward and feedback manners. The description also has described these metadata and control pathways in exemplary videoconferencing applications. Although the techniques of the present disclosure find application with videoconferencing services, the principles of the disclosure may find application with a variety of other services. For example, the principles of the present disclosure, relating to the flow of metadata and image capture control, need not require a human user to visually participate in a video conference session.

In some embodiments, the principles of this disclosure may be applied to a remote terminal that processes video frames for object recognition, implemented in software or hardware. For example, the remote object-detection algorithm may send control inputs back to the image capture system to enhance the object detection algorithm's performance. In another exemplary application, the remote terminal may perform image analysis, including document scanning or optical character recognition. A remote document scanner algorithm may use the principles outlined in this disclosure to send control inputs to the image capture system, enhancing image exposure, resolution, camera focus, or camera illumination and strobe, for better document scanning results. In another exemplary application, the remote terminal may have unique or high performance computational capabilities, enabling it to perform image reprocessing and enhancement. The remote terminal may use detailed metadata, including the image exposure settings, the image capture hardware identification, and mathematical models of the image noise model provided in metadata, to enhance the image. The algorithm may also send real-time control inputs back to the camera capture system to specify exposure, focus, and image illumination.

In another exemplary application, the remote terminal may perform image encryption or decryption. The techniques described herein permit a remote terminal to establish securely secure communication with an image co-processor, which may enable secure data transfer even in cases where other components of the terminal in which the co-processor is deemed not reliable or trustworthy for the communication application.

In another exemplary application, the remote terminal may receive video data for the purposes of image archival or publication.

In another exemplary application, the remote terminal may be receiving video data for the purposes of gaming or virtual reality, in which image data from a camera is integrated with graphical content from other sources, including images of goods in a shopping application, or another simulated environment. Video data may be processed on the remote system for the purposes of avatar-control or gesture-control.

In each of the foregoing examples, the integrated system involves flow of metadata and control inputs between a remote terminal 180 and the image co-processor 120.

Although FIGS. 1, 3 and 5 illustrate the terminals as notebook computers and tablet computers, respectively, the principles of the present disclosure are not so limited. Embodiments of the present disclosure find application not only with laptop computers and tablet computers but also display devices, servers, smartphones, media players, and/or dedicated video conferencing equipment. The terminals may be interconnected by any number of networks that convey image data among the terminals, including, for example, wireline and/or wireless communication networks. For example, the communication network may exchange data in circuit-switched and/or packet-switched channels. Representative networks include telecommunications networks, local area networks, wide area networks and/or the Internet. For the purposes of the present discussion, the architecture and topology of the networks are immaterial to the operation of the present disclosure unless explained hereinabove.

Several embodiments of the disclosure are specifically illustrated and/or described herein. However, it will be appreciated that modifications and variations of the disclosed embodiments are covered by the above teachings and within the purview of the appended claims without departing from the spirit and intended scope of the disclosure.

I claim:

1. An image processing device, comprising:
   an image capture system;
   an image processor, providing a communication path from the image capture system to an internal communication pathway of the image processing device; and
   a central processing unit communicatively coupled to the internal communication pathway of the image processing device, the central processing unit executing a process that interacts with processed image data from the image processor;
   wherein, responsive to metadata from the central processing unit representing a configuration of image data output by the central processing unit, the image processor invokes an operation performed on newly-received image data to change configuration of data output by the image processor to match the configuration output by the central processing unit.

2. The device of claim 1, wherein the invoked operation alters a frame rate of the newly-received image data in response to metadata identifying an effective frame rate of image data output by the central processing unit.

3. The device of claim 1, wherein the invoked operation resizes the newly-received image data in response to metadata identifying an effective frame size of image data output by the central processing unit.

4. The device of claim 1, wherein the invoked operation alters an exposure time of the image capture system in response to metadata identifying an effective frame rate of image data output by the central processing unit.

5. The device of claim 1, wherein the invoked operation alters a zoom setting of the image capture system in response to metadata identifying an effective frame size of image data output by the central processing unit.

6. The device of claim 1, wherein the invoked operation is an encryption process.

7. The device of claim 1, wherein the process is an application executed by the central processing unit.

8. The device of claim 1, wherein the process is a display process of an operating system executed by the central processing unit.

9. The device of claim 1, wherein the image processor alters operations performed on newly received image data responsive to second metadata received from the image capture system.

10. A method, comprising:
    within an image processing device, generating metadata representing a configuration of image data output by a first process executed on first data of a video sequence by a central processing unit of the device;
    relaying the metadata upstream to an image co-processor that receives image data from an image capture system;
    adjusting an operational parameter of the image co-processor based on the metadata representing the configuration of image data output by the central processing unit; and
    invoking a second process on image data thereafter received from the image capture system causing data output by the image co-processor to match the configuration of data output by the central processing unit.

11. The method of claim 10, wherein:
    the invoking includes altering an exposure time of the image capture system based on the metadata.

12. The method of claim 10, wherein:
    the invoking includes altering a zoom setting of the image capture system based on the metadata.

13. The method of claim 10, wherein:
    the invoking includes altering a frame rate of the image capture system based on the metadata.

14. The method of claim 10, wherein:
    the invoking includes altering a resolution of the image capture system based on the metadata.

15. The method of claim 10, wherein the invoked process is an encryption process.

16. The method of claim 10, further comprising:
within the image processing pipeline, generating second metadata representing operational parameters of image processor;
relaying the second metadata to the processing component within the image processing pipeline;
invoking a process on processing component based on the second metadata, the processing component being farther from the image source in the pipeline than the image processor.

17. The method of claim 10, wherein:
the image processor processes input image data for each of a plurality of image distribution pipelines and
the method further comprises, responsive to the metadata:
identifying the pipeline to which the metadata relates, and
altering, at the image processor, processing parameters for the input image data for the respective identified pipeline to conform the input image data to the configuration represented by the metadata, and
continuing the processing using the altered processing parameters at the image processor.

18. The method of claim 17, wherein the altered processing parameter involves digital gain.

19. The method of claim 17, wherein the altered processing parameter involves blur of selected image content within frames of data.

20. The method of claim 17, wherein the altered processing parameter involves encryption of image data.

21. The method of claim 17, further comprising providing each instance of processed image data to the respective pipelines.

22. The method of claim 17, responsive to second metadata from the image capture system, the image processor invokes a second process to be performed on newly-received image data.

* * * * *